United States Patent [19]

Ishitsubo et al.

[11] Patent Number: 4,697,065
[45] Date of Patent: Sep. 29, 1987

[54] VEHICLE MIRROR ARRANGEMENT

[75] Inventors: Kenji Ishitsubo, Kanagawa; Yoshinobu Abe, Tokyo, both of Japan

[73] Assignee: Nissan Motor Company, Limited, Japan

[21] Appl. No.: 837,272

[22] Filed: Mar. 7, 1986

[30] Foreign Application Priority Data

Mar. 20, 1985 [JP] Japan .............................. 60-38941[U]

[51] Int. Cl.$^4$ ........................... B60R 1/06; H05B 3/20
[52] U.S. Cl. ................. 219/219; 237/12.3 R; 98/2.09; 350/637; 219/202
[58] Field of Search ......... 350/588, 637, 632; 237/12.3 R; 98/2.09, 2.10; 219/219, 200, 201, 202, 218

[56] References Cited

U.S. PATENT DOCUMENTS

| 3,045,551 | 7/1962 | Bonanno | 219/203 |
| 3,052,787 | 9/1962 | Williams | 350/588 |
| 4,283,117 | 8/1981 | Ellis | 350/588 |
| 4,560,250 | 12/1985 | Russell | 350/588 |

FOREIGN PATENT DOCUMENTS

| 2537652 | 3/1977 | Fed. Rep. of Germany | 350/588 |
| 3105206 | 9/1982 | Fed. Rep. of Germany | 350/588 |

Primary Examiner—E. A. Goldberg
Assistant Examiner—Teresa J. Walberg
Attorney, Agent, or Firm—Leydig, Voit & Mayer

[57] ABSTRACT

A vehicle mirror arrangement includes a base and a housing accommodating a mirror. A mechanism movably connects the mirror housing to the base. A device serves to heat the gap between the base and the mirror housing in order to melt ice which may freeze the mirror housing to the base and thus which may prevent adjustment of the orientation of the mirror housing.

9 Claims, 4 Drawing Figures

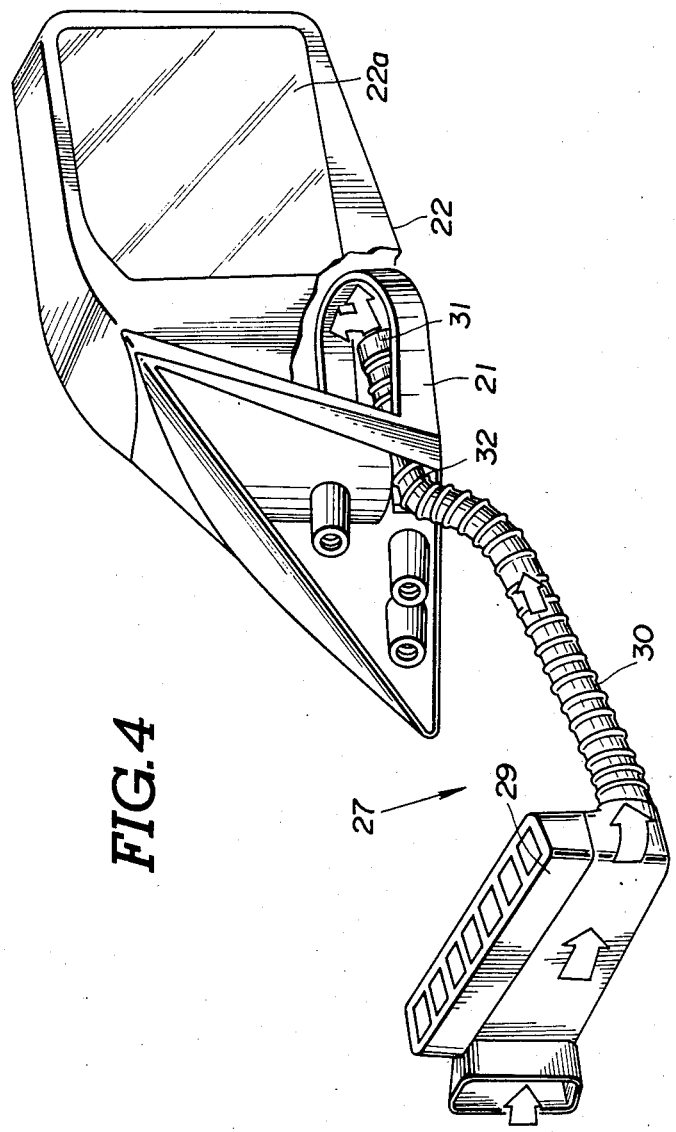

VEHICLE MIRROR ARRANGEMENT

BACKGROUND OF THE INVENTION

1. Field of the Invention

This invention relates to a vehicle mirror, such as an automotive vehicle mirror.

2. Description of the Prior Art

Some kinds of automotive vehicle mirror arrangements include a base fixed to the vehicle body, a housing accommodating a mirror and pivotably supported by the base, and a motor for adjusting the orientation of the housing relative to the base.

In freezing weather, when water enters the gap between the base and the housing, the housing tends to freeze to the base and thus be locked up.

SUMMARY OF THE INVENTION

It is an object of this invention to provide a vehicle mirror arrangement including a movable mirror housing equipped with a countermeasure to lock-up due to icing.

In accordance with this invention, a vehicle mirror arrangement includes a base and a mirror housing. A mechanism movably connects the mirror housing to the base. A device serves to heat a gap between the base and the mirror housing. The device may serve to melt ice which freezes the mirror housing to the base.

BRIEF DESCRIPTION OF THE DRAWINGS

FIG. 4 is a perspective view, partial cutaway, of a vehicle mirror arrangement according to a second embodiment of this invention.

DESCRIPTION OF THE FIRST PREFERRED EMBODIMENT

Figure 1:
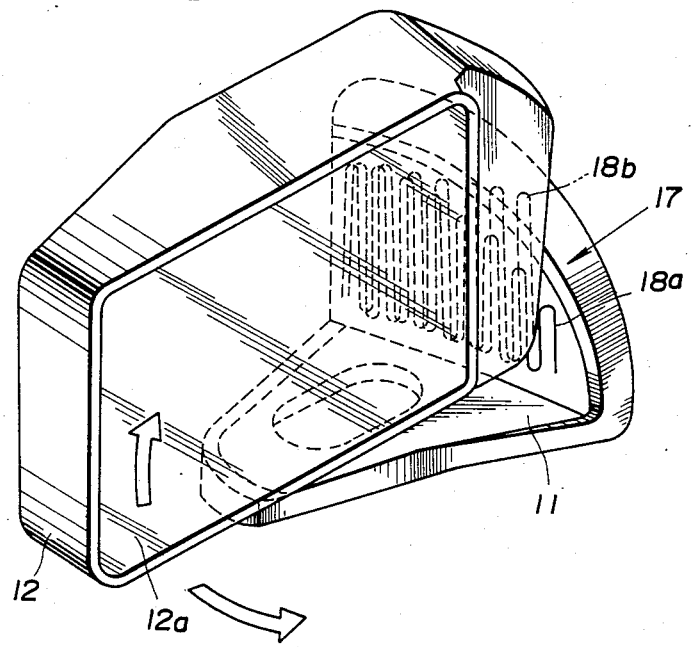
FIG. 1 is a perspective view of a vehicle mirror arrangement according to a first embodiment of this invention.
Figure 2:
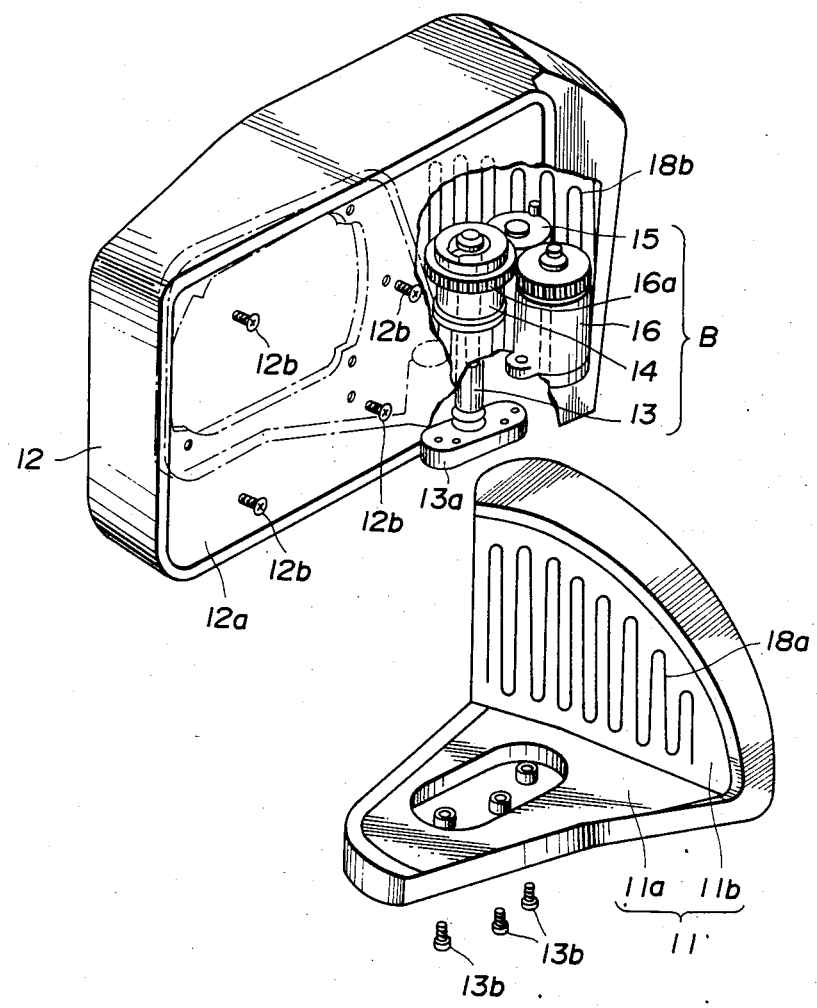
FIG. 2 is an exploded perspective view, partial cutaway, of the vehicle mirror arrangement of FIG. 1.

With reference to FIGS. 1 and 2 showing a first embodiment of this invention, a vehicle mirror arrangement includes a base 11 attached to part of a vehicle body, such as a door trim. The base 11 is roughly L-shaped, having a horizontal portion 11a and a vertical portion 11b extending upward from the horizontal portion 11a.

A housing 12 accommodating a mirror 12a is pivotably mounted on the base horizontal portion 11a by means of a shaft 13 extending upward from the base horizontal portion 11a. The mirror 12a is fixed to the housing 12 by means of screws 12b. The lower end of the pivot shaft 13 is supported by a member 13a which is secured to the base horizontal portion 11a by screws 13b. One side of the mirror housing 12 is covered by the base vertical portion 11b.

A clutch 14 is supported on the pivot shaft 13. The mirror housing 12 is connected via the clutch 14 to a housing drive gear 16a supported on the pivot shaft 13. The housing drive gear 16a is connected to the output shaft of an electic motor 15 by means of reduction gears 16. When the motor 15 is activated, the housing drive gear 16a rotates so that the mirror housing 12 pivots relative to the base 11 and specifically moves between a normal position and a retracted position. It should be noted that activation of the motor 15 also allows fine adjustment of the normal position of the mirror housing 12. When the mirror housing 12 is manually moved to its retracted position, the clutch 14 uncouples the housing 12 from the gear train for the motor power transmission and thus allows movement of the housing 12 independent of the gear train. The motor 15 is electrically connected to an electrical power source, such as a vehicle battery, via a switch (not shown) mounted on an instrument panel within a vehicle interior. The orientation or angle of the mirror housing 12 relative to the base 11 is controlled by actuating this switch, which will be called a position control switch hereinafter.

The pivot shaft 13, the clutch 14, the motor 15, the reduction gears 16, and the housing drive gear 16a constitute a moving section B of the vehicle mirror arrangement. A sealing member prevents ingress of water into the moving section B.

A device 17 serves to heat the opposing areas of the base vertical portion 11b and the side of the mirror housing 12. Specifically, the heating device 17 includes first and second heating elements 18a and 18b fixed to or printed on the opposing surfaces of the base vertical portion 11b and the side of the mirror housing 12 respectively. One of these heating elements 18a and 18b may be omitted.

Figure 3:
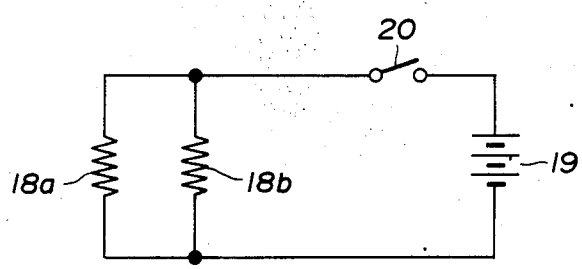
FIG. 3 is a schematic diagram of the heating device of FIGS. 1 and 2, and its power supply control circuit.

As shown in FIG. 3, the heating elements 18a and 18b are electrically connected to an electrical power soure 19, such as a vehicle battery, via a switch 20 mounted on the vehicle instrument panel near the position control switch. When the heating control switch 20 is closed and opened, the heating elements 18a and 18b are activated and deactivated respectively.

In cases where water enters the gap between the base vertical portion 11b and the side of the mirror housing 12 and then freezes so that the mirror housing 12 is frozen to the base vertical portion 11b, the heating control switch 20 is closed to activate the heating elements 18a and 18b. The heating elements 18a and 18b remain energized until the ice melts and thus the mirror housing 12 is released from the base vertical portion 11b. After the mirror housing 12 is free of ice, position control of the mirror housing 12 is enabled.

A thaw detector may be added. Specifically, this detector includes a temperature sensor exposed to the gap between the base vertical portion 11a and the side of the mirror housing 12, and an indicator mounted on the vehicle instrument panel and representing the extent of ice melting on the basis of the signal from the temperature sensor.

This embodiment may also be applied to a mirror arrangement including a mirror housing which can be moved relative to a base by a manual operation only.

DESCRIPTION OF THE SECOND PREFERRED EMBODIMENT

With reference to FIG. 4 showing a second embodiment of this invention, a vehicle mirror arrangement includes a base 21 attached to a vehicle door trim. A housing 22 accommodating a mirror 22a is pivotably mounted on the base 21 by means of a mechanism similar to that of the embodiment of FIGS. 1-3. The position of the mirror housing 22 relative to the base 21 can be adjusted by an electric motor and a gear train similar to those of the embodiment of FIGS. 1-3.

A device 27 serves to heat the gap between the base 21 and the mirror housing 22. Specifically, the heating device 27 includes a hose 30 connecting a vehicle side window defroster 29 to the gap between the base 21 and the mirror housing 22. It should be noted that the vehicle side window defroster 29 resides near the vehicle door trim to which the base 21 is attached. The hose 30 extends through an opening 32 in the base 21 and terminates within the gap between the base 21 and the mirror housing 22. The end of the hose 30 within the gap is provided with a harness 31. When the defroster 29 is activated, hot or warm air is driven from the defroster 29 into the gap between the base 21 and the mirror housing 22 via the hose 30. The operation of the defroster 29 is adjusted by means of a heating control switch or lever (not shown) mounted on an instrument panel within the vehicle interior.

In cases where water enters the gap between the base 21 and the mirror housing 12 and then freezes so that the mirror housing 12 is frozen to the base 21, the heating control switch 22 is actuated to activate the defroster 29. After the defroster 29 is activated, hot or warm air is driven by the defroster 29 into the gap between the base 21 and the mirror housing 22 via the hose 30. The defroster 29 remains activated until the ice melts and thus the mirror housing 22 is released from the base 21. Once the mirror housing 22 is free, position control of the mirror housing 22 is enabled.

In cases where the rate of hot or warm air flow from the defroster 29 is adjustable, this rate is chosen in accordance with the atmospheric temperature and with the amount of ice.

A thaw detector may be added. Specifically, this detector includes a temperature sensor exposed to the gap between the base 21 and the mirror housing 22, and an indicator mounted on the vehicle instrument panel and representing the extent of ice melting on the basis of the signal from the temperature sensor.

This embodiment may also be applied to a mirror arrangement including a mirror housing which can be moved relative to a base by a manual operation only.

What is claimed is:

1. A vehicle mirror arrangement comprising:
   (a) a base attachable to a vehicle body;
   (b) a mirror housing;
   (c) means for movably connecting said mirror housing to said base; and
   (d) means for heating a gap between said base and said mirror housing, said heating means including an electrically powered heating element mounted on at least a surface of said base opposing said mirror housing.

2. The arrangement of claim 1, wherein the heating means comprises another electrically powered heating element mounted on a surface of the base opposing the mirror housing.

3. The arrangement of claim 1, further comprising a means for detecting whether ice is melting in the gap.

4. The arrangement of claim 3 wherein said ice melting detector means comprises a temperature sensor exposed to the gap and an indicator which translates a signal from the temperature sensor into an output which indicates whether ice is being melted in the gap.

5. A vehicle mirror arrangement comprising:
   (a) a base attachable to a vehicle body;
   (b) a mirror housing;
   (c) means for movably connecting said mirror housing to said base; and
   (d) means for heating a gap between said base and said mirror housing, said heating means including an electrically powered heating element mounted on at least a surface of said mirror housing opposing said base.

6. A vehicle mirror arrangement comprising:
   (a) a base attachable to a vehicle body;
   (b) a mirror housing;
   (c) means for movably connecting said mirror housing to said base; and
   (d) means for heating a gap between said base and said mirror housing, said heating means including a defroster and means for guiding air from the defroster to the gap between said base and said mirror housing.

7. The arrangement of claim 6, wherein the guiding means comprises a hose connecting the defroster to the gap between said base and said mirror housing.

8. A vehicle mirror arrangement comprising:
   (a) a base;
   (b) a mirror housing;
   (c) means for movably connecting said mirror housing to said base; and
   (d) means for heating a gap between said base and said mirror housing, said heating means comprising first and second electrically powered heating elements mounted on opposing surfaces of said base and said mirror housing respectively.

9. A vehicle mirror arrangement comprising:
   (a) a base attachable to a vehicle body;
   (b) a mirror housing, said base and said mirror housing defining a gap therebetween;
   (c) means for movably connecting said mirror housing to said base; and
   (d) means for heating the gap, said heating means being positioned such that the heat released therefrom is concentrated in said gap to melt any ice in the gap and allow movement of said mirror housing on said base.

* * * * *